United States Patent

[11] 3,614,311

| [72] | Inventors | Tatsuo Fujiyasu;<br>Kouichi Hara, both of Katsuta-shi, Japan |
|------|-----------|------|
| [21] | Appl. No. | 802,006 |
| [22] | Filed | Feb. 25, 1969 |
| [45] | Patented | Oct. 19, 1971 |
| [73] | Assignee | Hitachi, Ltd.<br>Tokyo, Japan |
| [32] | Priority | Feb. 28, 1968 |
| [33] | | Japan |
| [31] | | 1226/43 |

[54] APPARATUS FOR SIMULTANEOUSLY DISPLAYING A PLURALITY OF IMAGES OF AN OBJECT BEING ANALYZED IN AN ELECTRON BEAM DEVICE
2 Claims, 7 Drawing Figs.

[52] U.S. Cl. .................................................. 178/6.8,
178/DIG. 6, 250/49.5 A, 250/49.5 PE
[51] Int. Cl. ..................................................... H04n 5/22,
H04n 5/14
[50] Field of Search ........................................ 178/6, DIG.
6, 7.55 E, 6.8; 250/49.5 A, 49.58 PE, 49.5 T

[56] References Cited
UNITED STATES PATENTS

| 2,490,561 | 12/1949 | Ussler, Jr. | 178/7.1 |
| 2,653,186 | 9/1953 | Hurford | 178/7.1 |
| 2,784,247 | 3/1957 | Hurford | 178/5.8 |
| 2,851,522 | 9/1958 | Hollywood | 178/7.3 |
| 3,235,727 | 2/1966 | Shapiro | 250/49.5 (8) |
| 3,459,888 | 8/1969 | Sokolov | 178/7.7 |

*Primary Examiner*—Robert L. Griffin
*Assistant Examiner*—Richard K. Eckert, Jr.
*Attorney*—Craig, Antonelli, Stewart and Hill

ABSTRACT: A device for electronically displaying the state of surface or the like of an object placed in a field scanned with an electron beam, said surface state or the like being detected as any of several kinds of electromagnetic or corpuscular information and said detected information being introduced as a brightness-modulated signal to a display means such as a cathode-ray tube whose faceplate is scanned in synchronization with the above-mentioned scanning of the sample; characterized in that said device is constituted so that an optional portion of the displayed basic image representing a particular kind of information can be readily replaced with another image representing another kind of information pertaining to said surface state or the like of the sample.

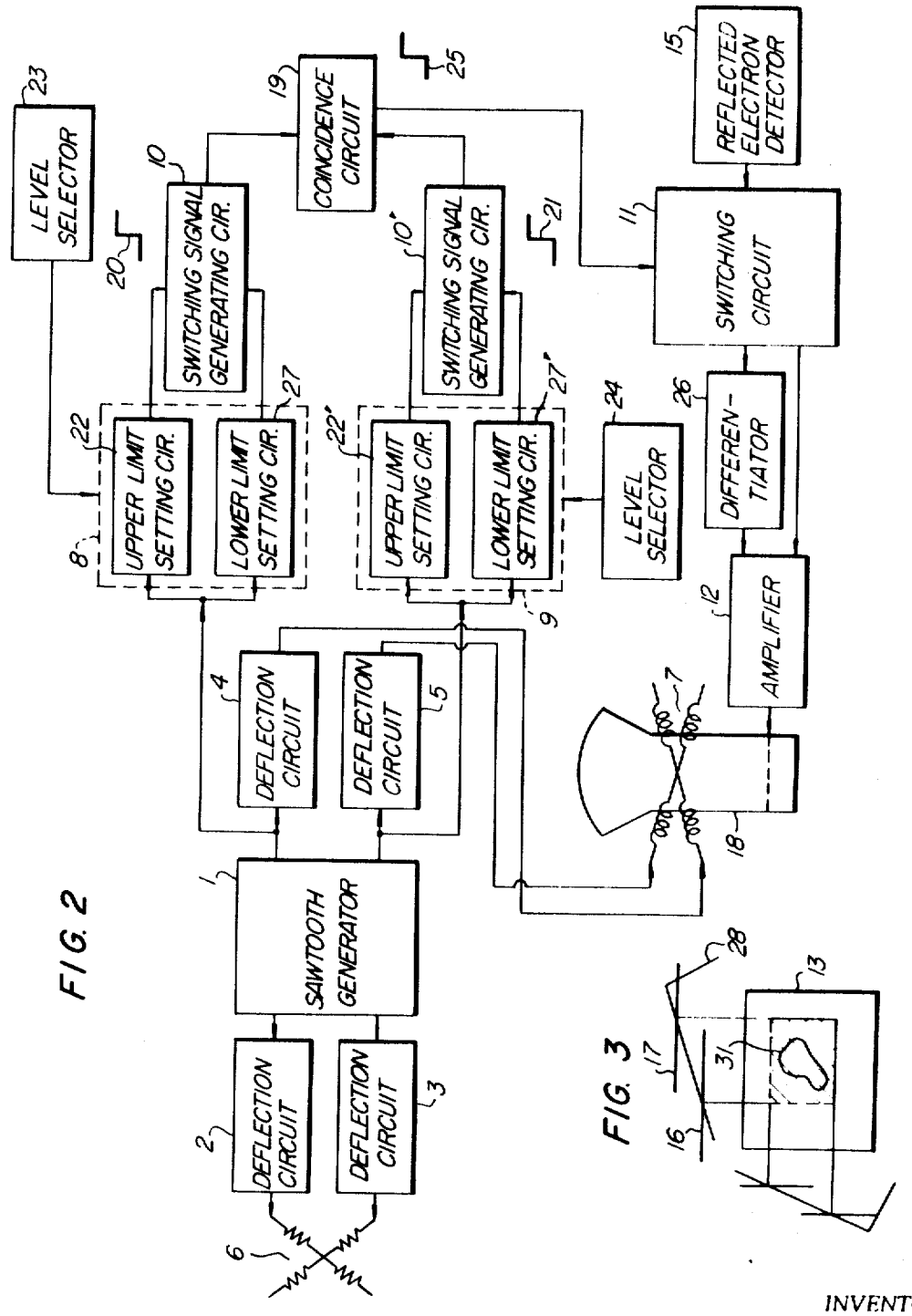

APPARATUS FOR SIMULTANEOUSLY DISPLAYING A PLURALITY OF IMAGES OF AN OBJECT BEING ANALYZED IN AN ELECTRON BEAM DEVICE

BACKGROUND OF THE INVENTION

1. Field of the Invention

This invention relates to an electronic display device for presenting an image of an object which is two-dimensionally scanned with a corpuscular beam, said image being produced on the basis of information obtained from said object as a result of said scanning.

2. Description of the Prior Art

In the known scanning-type electron microscope, scanning-type X-ray microanalyzer or similar electronic display devices, the object (or particularly, a specimen to be analyzed) is scanned with an examining corpuscular beam (or particularly, an electron beam form an electron gun) and information of the object detected in terms of secondary electrons, reflected electrons, X-rays or the like is used for brightness-modulation of a cathode-ray tube in which the display screen is scanned with a thus modulated electron beam in synchronization with the above-mentioned examining beam, thus an image of the object is displayed on the screen in terms of one of the above-mentioned informations. Recently, a among researchers a strong demand arose for a display device of the above-mentioned type in which an optional portion of the image which is now displayed with one kind of information, for example in terms of secondary electrons, can be easily replaced by another kind of information, for example by an image representing reflected electrons, X-rays or a differentiation of the basic image now on display.

SUMMARY OF THE INVENTION

In a scanning-type electron microscope or a scanning-type X-ray microanalyzer, the majority of the electrons of the scanning beam incident to a specimen penetrates the specimen. However, a part of the incident electrons is reflected at the surface of the specimen. The reflected electron has an energy spectrum ranging nearly up to that of the primary electrons, the value of the former energy being 5-50 kev. when that of the latter is 50 kev. and the amount of reflected electrons is greater for a material of high atomic number. On the other hand, the energy spectrum of the secondary electrons emitted from the surface of the sample has a peak approximately at 4 ev. Thus, the reflected electrons give an image of distinct contrast and are characterized in its dependence on the atomic number of the specimen. For example, a material contained in a different material can be detected by the difference in the amount of reflected electrons, when the distinction between the two materials is otherwise not clear. On the other hand, the image based on secondary electrons is suitable for observation of topographic structures because the low energy of the secondary electron gives a distinct reproduction of the surface state of the sample.

As described above, an image by reflected electrons and that by secondary electrons have different properties. Therefore, an urgent request has arisen for the possibility that, while an image is being displayed by either reflected electrons or secondary electrons on a display screen, a desired portion of the image is replaced by an image based on the other type of electrons.

The primary object of this invention is to provide a novel and useful device for displaying an image of an object, which fulfills the above-mentioned request of researchers.

The second object of this invention is to provide such a display device in which, while an image of the object based on one of electromagnetical and corpuscular information sources such as secondary electrons, reflected electrons and X-rays is being displayed on the display screen of a cathode-ray tube, an optionally selected portion of the image can be replaced by an image based on a different one of the above-mentioned information sources.

The third object of this invention is to provide such a display device in which, while an image based on one of the above-mentioned information sources is being displayed on the display screen, the contrast of the image in a desired area of the image can be changed.

The fourth object of this invention is to provide such a display device in which, while an image based on one of the above-mentioned information sources is being displayed on the display screen, the contrast of the image in an optionally selected area where the image is replaced by a different image based on a different information source, can be easily changed.

The fifth object of this invention is to provide such a display device in which, while an image based on one of the above-mentioned information sources is being displayed on the display screen, the shape and location of the area where the image is replaced by a different kind of image based on a different information source, can be optionally selected.

The sixth object of this invention is to provide such a display device which includes a plurality of cathode-ray tubes, each for displaying a different kind of image based on a different one of the above-mentioned information sources, and in which the contrast of the image in a desired area on each cathode-ray tube can be widely changed.

The seventh object of this invention is to provide such a display device which includes a plurality of cathode-ray tubes, each for displaying a different kind of image based on a different one of the above-mentioned information sources, and in which a desired portion of the image on each cathode-ray tube can be replaced by a different kind of image from the one now on display.

The eighth object of this invention is to provide such a display device which is adapted for photographing the above-described displays.

In order to attain the above-described objects, the display device of this invention comprises means for generating a corpuscular beam (particularly, an electron beam) and scanning an object (particularly, a sample to be tested) with said beam; an optional number of detecting means respectively for detecting different kinds of electromagnetical or corpuscular informations relating to said object resulting from the above-mentioned scanning; at least one cathode-ray tube whose electron beam is brightness-modulated depending basically on the information signal from a selected one of said detecting means and is deflected in synchronization with the above-mentioned scanning beam to scan the display screen of said cathode-ray tube, so that an image representing the selected information is displayed on said display screen; means for selecting a local area within said image in which the basic image is replaced by a different image representing a different kind of information and producing a signal indicative of said selected local area; and a switching means which operates in response to signals from said local area selecting means to effect said replacement of the basic image by the different image in said selected local area.

BRIEF DESCRIPTION OF THE DRAWINGS

FIG. 2 is a block diagram showing another embodiment of the same device;

FIG. 3 is a schematic diagram illustrating the operation according to this invention;

DESCRIPTION OF THE PREFERRED EMBODIMENTS

Figure 1:
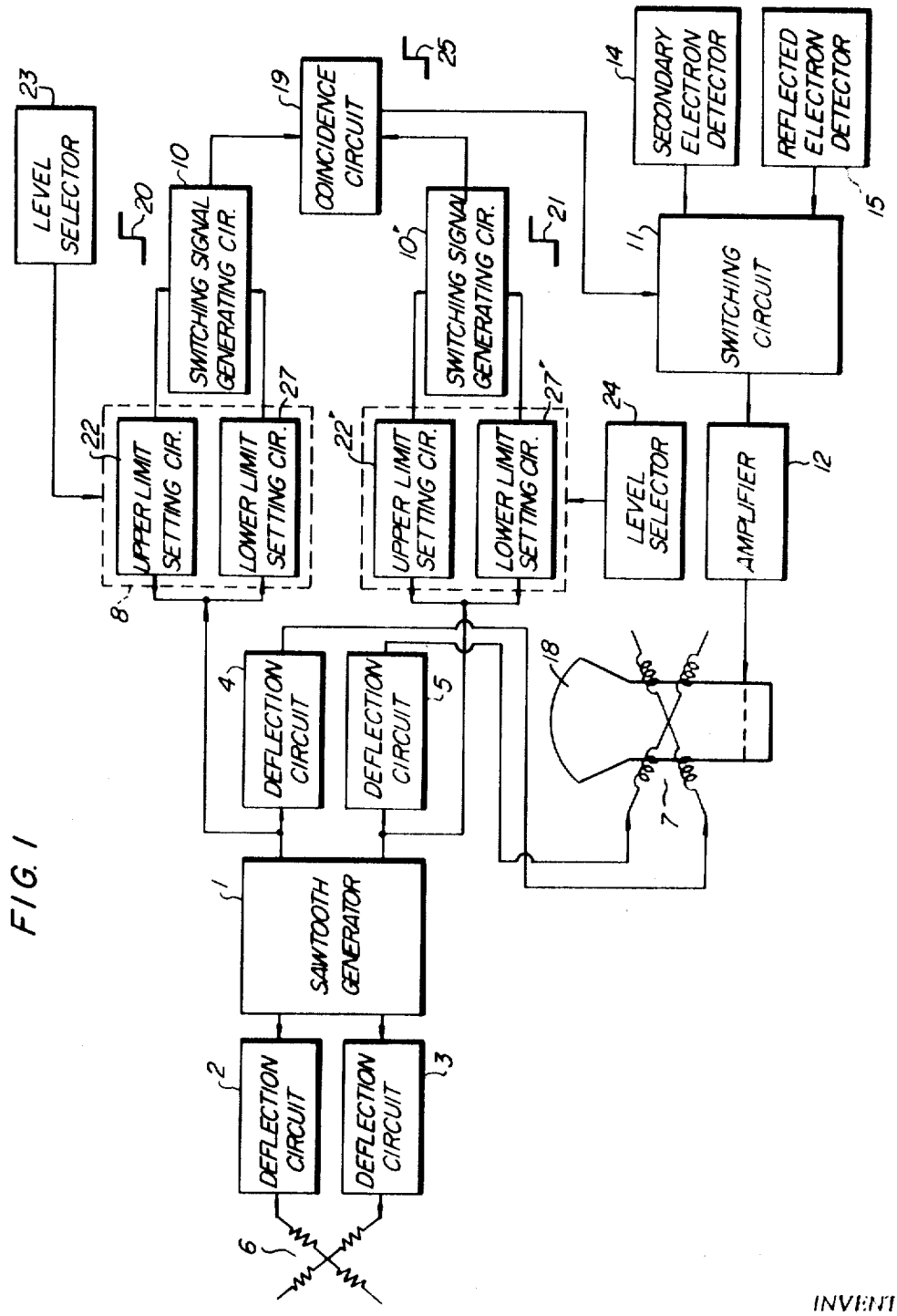
FIG. 1 is a block diagram showing an embodiment of the device for displaying an image of an object according to this invention.

Referring to FIG. 1 which shows a block diagram of the display device of this invention applied to an electron microscope, reference numeral 1 indicates a sawtooth voltage generator for producing horizontal and vertical deflecting signals; 2, 3, 4 and 5 deflection circuits for supplying and controlling the beam deflection currents, of which the circuits 2 and 3 are connected to deflection coils 6 of the electron microscope and the circuits 4 and 5 to deflection coils 7 of a cathode-ray tube which serves as the display means. Though separate pairs of deflection circuits 2, 3 and 4, 5 are provided for the electron microscope and the cathode-ray tube in this embodiment, it will be understood that a single pair of such circuits can be used for both the microscope and the cathode-ray tube, provided that the circuits are capable of controlling the currents in the respective pairs of deflection coils 6 and 7 in synchronization with each other.

A portion of each of the paired outputs from the sawtooth voltage generator 1 is led to the associated one of circuit group 8 or 9 which has a function resembling a waveheight analyzer as described hereunder. Referring to FIG. 3, reference numeral 13 indicates the display frame of the cathode-ray tube and 28 designated a waveform of the sawtooth current for deflecting the electron beam in the horizontal direction. In the horizontal sweep, if the deflecting current reaches a selected level indicated by reference numeral 16, a signal is produced from a lower limit setting circuit 27 (FIG. 1), and a switching signal generating circuit 10 is actuated with said signal to produce a signal.

Reference numerals 14 and 15 indicate different kinds of detectors for detecting the electromagnetical or corpuscular reaction to the scanning beam of the sample placed in the electron microscope. In this embodiment, the detector 14 is a secondary electron detector and 15 a reflected electron detector. Signals from these detectors 14 and 15 are selectively switched by a switching circuit 11 to be led o the control grid of the cathode-ray tube, through an amplifier 12 if necessary.

Therefore, if the coincidence circuit 19 is actuated by the signals from the switching signal generating circuits 10, 10' according to conditions described hereinafter, the output signal from the coincidence circuit 19 will cause the switching circuit 11 to operate so as to cut off the detector hitherto connected to the cathode-ray tube 18 and to connect the other detector to the tube 18. Accordingly, an image different from the initial image is observed on the display screen of the cathode-ray tube 18 in a limited area defined at a point on each horizontal sweep.

Meanwhile, returning to FIG. 3, if the deflecting current 28 reaches another predetermined level 17, a signal is produced from an upper limit setting circuit 22 and the switching signal generating circuit 10 is turned off, which in turn resets the coincidence circuit 19 according to conditions described hereinafter. Accordingly, the switching circuit 11 acts to restore the initial connection between the cathode-ray tube 18 and one of the detectors 14, 15. Thus, the initial or basic image is restored in the above-mentioned limited area in the display screen.

The upper limit and the lower limit to be set in the horizontal setting circuit group 8 or the vertical setting circuit group 9 can be optionally selected by varying the respective bias voltages. Thus, the area in which the different kind of image is displayed can be optionally chosen. Reference numerals 23, 24 indicate the respective level controllers for this purpose.

Though the above explanation has been given in connection with the horizontal scanning of the image, it will be obvious from FIG. 3 that the same description is applicable to the vertical scanning.

Now, the operation of the coincidence circuit 19 will be described. This circuit 19 is an AND gate which produces a signal as an output only when it receives two input signals during a limited interval.

It should be noted that if the switching signal generating circuits 10, 10' for the horizontal and the vertical time bases independently trigger the switching circuit 11, the operation of the switching circuit will be confused, or the vertical limit of the different kind of image will not be defined in the display. Therefore, the coincidence circuit 19 is provided so as to produce a signal for operating the switching circuit 11 only when the circuit 19 receives signals from both the horizontal and the vertical switching signal generating circuits 10. 10' during a fixed interval.

The above operation will be described more in detail hereunder. When the horizontal deflecting current from the sawtooth generator 1 reaches a certain selected lower level in each cycle of the horizontal scanning thereby to actuate the horizontal lower limit setting circuit 27, the switching signal generating circuit 10 delivers a trigger signal as indicated by reference numeral 20 which is fed to the coincidence circuit 19. The coincidence circuit 19 is composed so as to produce an output signal as indicated by reference numeral 25 only if it receives another similar trigger signal 21 from the vertical switching signal generating circuit 10' during a predetermined interval. The output signal of the coincidence circuit 19 causes the switching circuit 11 to operate so as to interchange the two detectors. Then, upon arrival of the horizontal deflecting current at a predetermined upper level, the output signal 20 of the circuit 10 returns to the normal voltage level. Similarly, when the vertical deflecting current reaches a predetermined upper level, the output signal 21 of the circuit 10' returns to its normal voltage level. And if both of said output signals, that is, the pair of inputs to the coincidence circuit 19 return to the normal voltage level during a predetermined interval, the output signal 25 from the coincidence circuit 19 returns to the normal voltage level and causes the switching circuit 11 to operate so as to restore the initial connection of the detectors to the cathode-ray tube.

Thus, in the above embodiment, the functions of the lower or upper limit setting circuits for the horizontal and vertical time bases are interlinked mutually, and a desired area at a desired portion of the basic image on the display screen can be replaced by a different kind of image by selecting the voltage levels in level selectors 23, 24. This feature of the present invention provides a very useful means which allows comparison of images based on different informations of the same sample.

FUrther, instead of the above-described interlinked setting of the lower or upper limits for the horizontal and vertical time bases, a unified setting of the lower or upper limits by either one of the horizontal or vertical setting circuits is possible. In this case, the switching circuit 11 can be operated without the use of the coincidence circuit 19.

Assuming that an information signal from the reflected electron detector 15 has initially been fed to the cathode-ray tube and that a signal from the secondary-electron detector 14 is now fed to the tube for a selected interval of the scanning by the operation of the switching circuit 11, the crosshatched area in the display field shown in FIG. 3 represents the image based on the secondary electrons and the other portion of the field indicates the image based on the reflected electrons.

Next, another embodiment of this invention will be described. In an electronic display device such as a scanning-type electron microscope or scanning-type X-ray microanalyzer, the contrast of the image in a portion of the field of view is sometimes not sufficiently distinct; or in another case especially clear contrast is requested in a particular portion of the field of view. Meeting such request, this invention provides a display device in which the contrast of the image in an optionally selected portion of the field of view can be easily changed.

Referring to FIG. 2 which shows a block diagram of an embodiment of such a display device, the same reference numerals as those shown in FIG. 1 indicate corresponding components or circuits. The only additional numeral 26 indicates a differentiating circuit.

In the operation, if the horizontal deflecting current reaches a predetermined level 16 as shown in FIG. 3, a signal is produced from the lower level setting circuit 27 to actuate the switching signal generating circuit 10, which in turn produces a signal as an input to the coincidence circuit 19. The vertical counterpart 10' of the switching signal generating circuit also produces a similar signal indication a vertical lower level. When two input signals to the coincidence circuit 19 coincide within a predetermined interval, the circuit 19 produces a signal to drive the switching circuit 11. Whereupon, the switching circuit 11 operates so as to connect the output of the detector to the route which includes the differentiator 26. Therefore, the cathode ray tube 18 is fed with a differentiated signal of the detected information signal. Then, if the horizontal deflecting current reaches a predetermined upper level 17 as shown in FIG. 17, the upper level setting circuit 22 produces a signal, resulting in the reversed operation of the switching circuit 11. ANd, the output from the detector is switched back to the route which does not include the differentiator 26, thereby the detected information signal being fed directly to the cathode-ray tube. Thus, the area of the field between the lower and upper levels is replaced by a differentiated image of the basic image, which gives a contrasty picture of the object. Further, the contrast of the image can be easily varied by changing the values of C and R in the differentiating circuit 26.

As described above, according to this invention, the contrast of the image can be widely varied in an area of the field optionally selected by means of the level selectors. Therefore, the display device of this invention is very useful for observing an image of poor contrast or a wide image.

Figure 4:
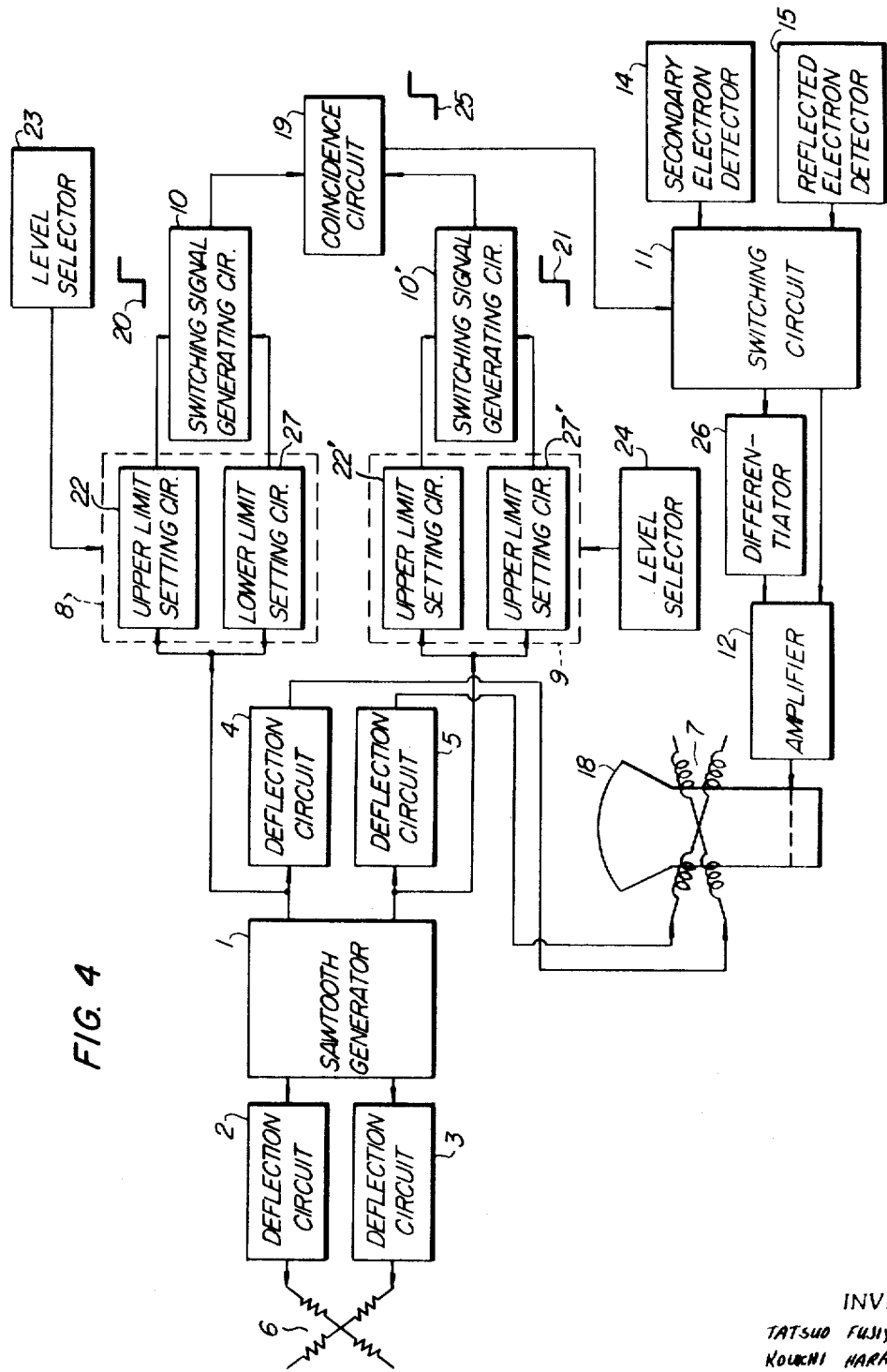
FIGS. 4, 5, 6 and 7 are block diagrams showing several alternative embodiments of the same device.

FIG. 4 relates to another embodiment of this invention in which, while an image originating from a selected one of a reflected electron detector or a secondary electron detector is being displayed, an optionally selected portion of the image can be replaced by an image from the other one of the detectors and further the contrast of said local image can be varied. That is, this embodiment is a combination of the two embodiments described above with reference to FIGS. 1 and 2. The switching circuit 11 is actuated in the same manner as described in connection with FIGS. 1 and 2, the horizontal as well as vertical lower and upper limits being set by the level selectors 23, 24. Assuming that initially the reflected electron detector 15 is connected by means of the switching circuit 11, with the cathode-ray tube 18 by the route which does not include a differentiator, the operation of the switching circuit 11 disconnects the reflected electron detector 15 from the cathode-ray tube for an interval between the lower and upper levels and connects the secondary electron detector to the cathode-ray tube through the differentiator 26. Therefore, the selected area within the basic image based on reflected electrons is replaced by an image corresponding to the differentiation of the image based on secondary electrons. It will be understood that the interconnection in the switching circuit 11 can be arranged so that the initial image signal from the reflected electron detector 15 is fed to the cathode-ray tube 18 through the differentiator 26 and the local image signal from the secondary electron detector 14 is directly connected to the tube 18.

As described above, according to this invention, a desired portion of the basic image can be replaced by a contrasty image representing a different kind of information.

Figure 5:
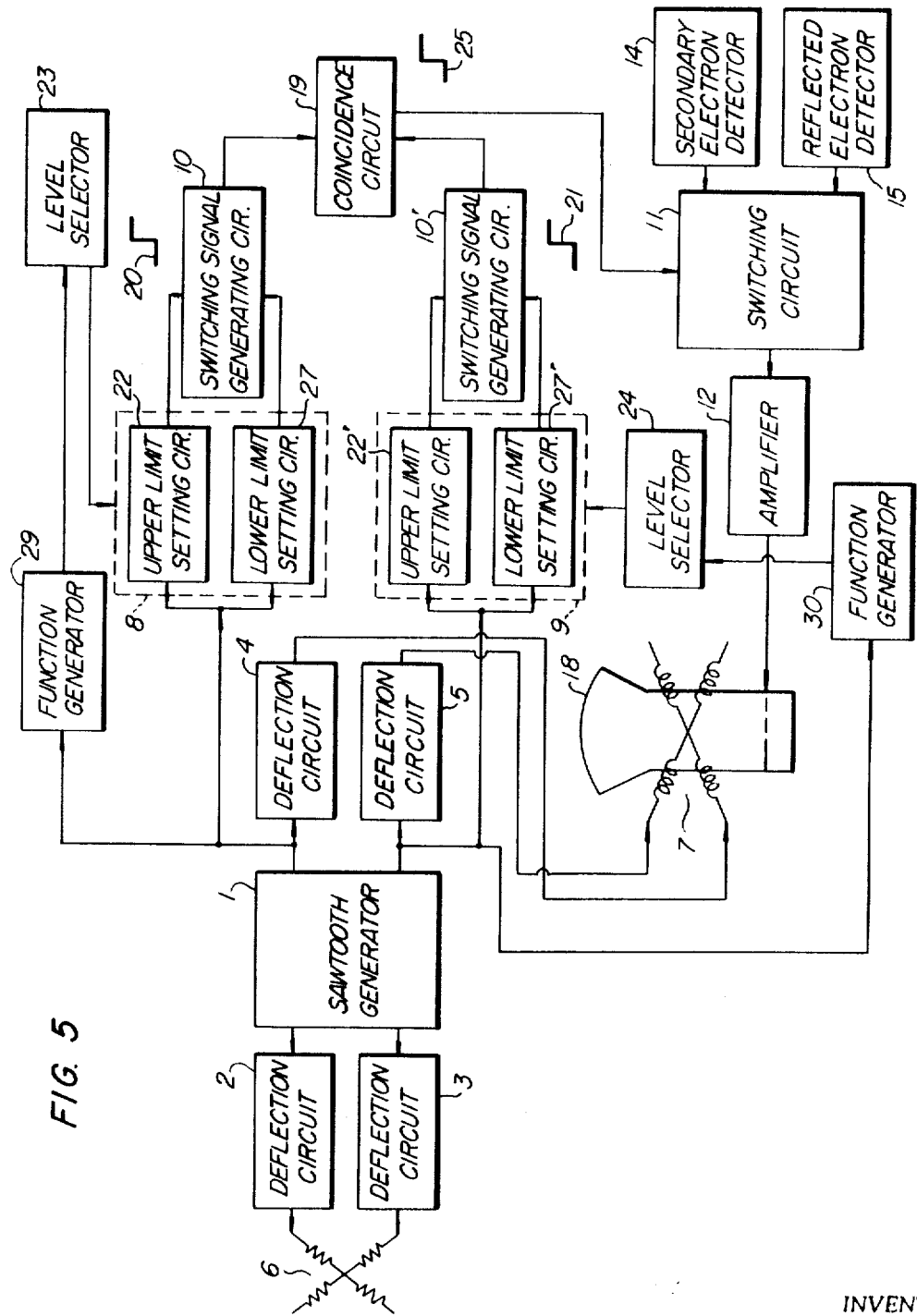

FIG. 5 relates to another embodiment of this invention, in which the shape of the local area displaying a different kind of image can be optionally changed, whereas in the previously described embodiments, the shape of the local area having a different image is limited to a rectangle which is defined by the horizontal as well as vertical lower and upper limits, as shown by the crosshatched area in FIG. 3. In practical use of display devices, the local area to be replaced by a different image is often desired to assume a particular shape other than a rectangle. This desire can be fulfilled by providing function generators 29, 30 which supply signals to the level selectors 23, 24 respectively so as to vary the lower and upper levels according to functions representing the desired shape, for example the shape as indicated by numeral 31 in FIG. 3. The same purpose will be attained by a single function generator connected to the horizontal level selector.

Figure 6:
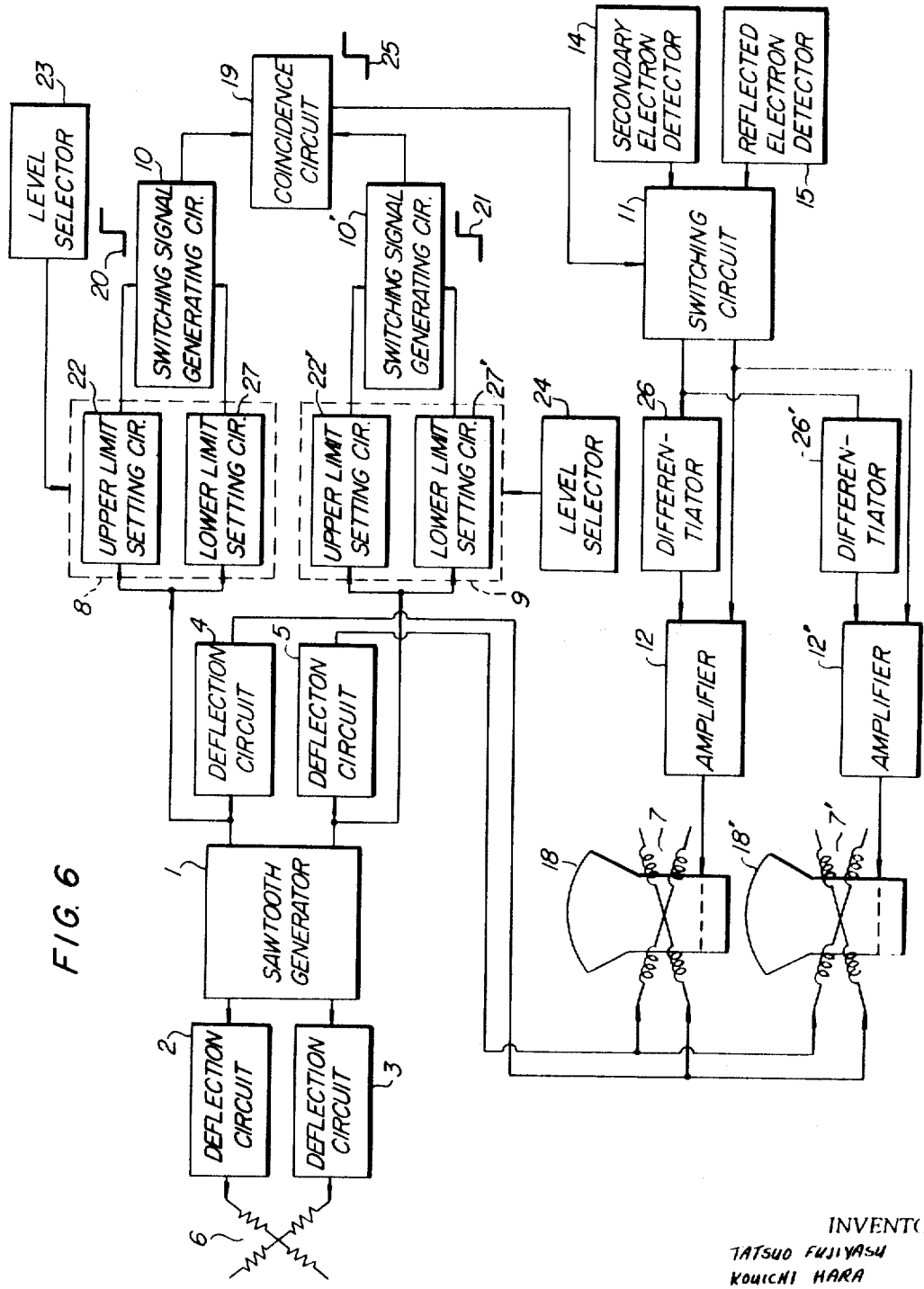

FIG. 6 relates to another embodiment of this invention, which includes two display tubes 18, 18' connected basically to the reflected electron detector 15 and the secondary electron detector 14 respectively by means of the switching circuit 11, and in which the contrast of the image can be widely changed in optionally selected corresponding local areas of the respective basic images on the two display tubes 18, 18'. The block diagram shown in FiG. 6 is the same as that shown in FIG. 2, except that the system of FIG. 6 includes two cathode-ray tubes, each being associated with an amplifier 12, 12' and a differentiator 26, 26', and further includes the secondary electron detector 14 besides the reflected electron detector 15. The operation of the system will be clear from the explanation given heretofore. Further, if it is necessary to be able to set the local contrasty areas of the two display tubes independently, the requirement will be fulfilled by providing two sets of local area defining circuits which include horizontal as well as vertical lower and upper limit setting circuits, coincidence circuits and other associated circuits.

Figure 7:
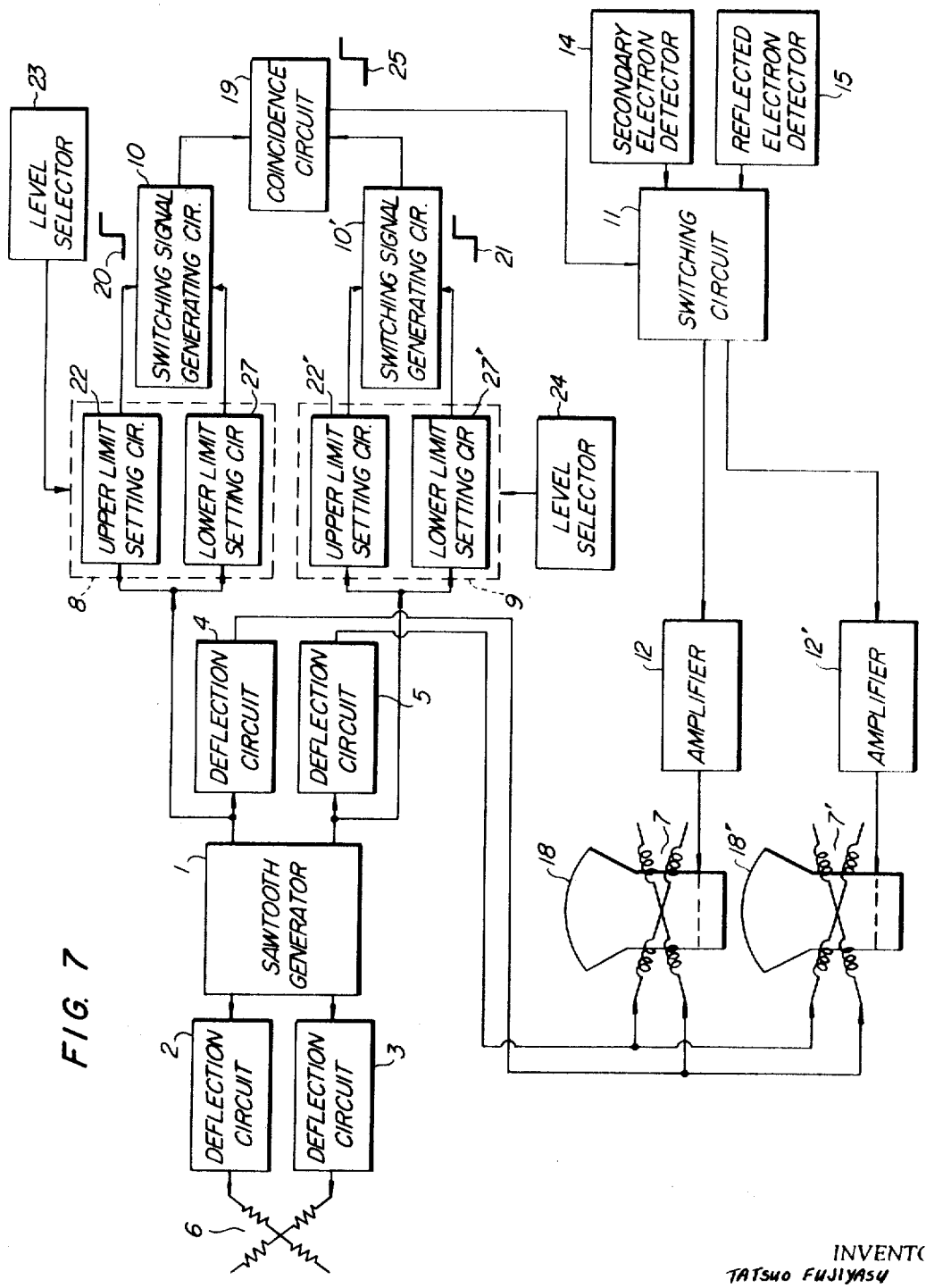

FIG. 7 relates to still another embodiment of this invention, which includes a pair of display tubes 18, 18' connected respectively to the reflected electron detector 15 and the secondary electron detector 14 by means of the switching circuit 11 and in which an optionally selected local area of the basic image on each of said pair of display tubes can be replaced by the corresponding area of the basic image of the other display tube of the pair. The system shown in FIG. 7 is the same as that shown in FIG. 1, except that the system of FIG. 7 includes two display tubes or cathode-ray tubes 18, 18' on which different kinds of images originating from the same object are respectively displayed and corresponding local area of the respective basic images defined by the lower and upper limit setting circuits 22, 22', 27, 27' can be replaced by each other's basic image of the pair. In this embodiment too, the local areas for displaying the different image on the respective display tubes can be independently defined as described in connection with the preceding paragraph. Further, it will be obvious that the number of detectors used with this device is not limited to the reflected electron detector and the secondary electron detector.

Finally, the display device of this invention can be adapted to make it possible to photograph the heretofore-described various images by providing the cathode-ray tube with an attachment for a camera.

As described above, this invention provides very useful display devices in which various kinds of images originating from an object can be compared on the same display screen and the contrast of a image in a desired portion of the field can be changed.

It will be understood that the invention should not be considered to be limited to the above-described embodiments, but various combination of said embodiments or other combinations of said embodiments and any known display devices or switching means are possible within the scope of this invention.

We claim:

1. A device for displaying a plurality of images of an object comprising means for directing an irradiating electron beam towards the object for scanning the object with said beam; an optional number of detecting means respectively for detecting different kinds of electromagnetical or corpuscular informations relating to said object resulting from the above-mentioned scanning; at least one cathode-ray tube whose electron beam is brightness-modulated depending basically on an information signal from a selected one of said detecting means and is deflected in synchronization with the above-mentioned scanning beam to scan the display screen of said cathode-ray tube, so that an image representing the selected information is displayed on said display screen; means for selecting a local area within said image in which the basic image is replaced by a different image representing a different kind of information and producing a signal indicative of said selected local area; and a switching means which operates in response to the signal from said local area selecting means to effect said replacement of the basic image by the different image in said selected local area, wherein said local area selecting means comprises at least a horizontal limits defining means and a function generator; said horizontal limits defining means including a lower limit setting means, an upper limit setting means and a switching signal generating means, an input terminal of said limits defining means being connected to an output of a sawtooth generator of the above-mentioned object scanning means, said switching signal generating means being composed so as to generate a signal as the output of said local area selecting means while the instantaneous value of said sawtooth voltage is between a lower level and an upper level set respectively in said lower and upper limit setting means, and said function generator being arranged to operate in synchronization with the above-mentioned object scanning beam and to vary said lower and upper levels to be set in said limit setting means according to a predetermined function which defines the desired shape of said local area of the image.

2. A display device for displaying a plurality of images of of an object comprising means for directing an irradiating electron beam towards the object for scanning the object with said beam, an optional number of detecting means respectively for detecting different kinds of electromagnetical or corpuscular informations relating to said object resulting from the above-mentioned scanning; at least one cathode-ray tube whose electron beam is brightness-modulated depending basically on an information signal from a selected one of said detecting means and is deflected in synchronization with the above-mentioned scanning beam to scan the display screen of said cathode-ray tube, so that an image representing the selected information is displayed on said display screen; means for selecting a local area within said image in which the basic image is replaced by a different image representing a different kind of information and producing a signal indicative of said selected local area; and switching means which operates in response to the signal from said local area selecting means to effect said replacement of the basic image by the different image in said selected local area, wherein said local area selecting means comprises at least a horizontal limits defining means and a function generator; said horizontal limits defining means including a lower limit setting means, an upper limit setting means and a switching signal generating means, an input terminal of said limits defining means being connected to an output of the sawtooth generator of the above-mentioned object scanning means, said switching signal generating means being composed so as to generate a signal at the output of said local area selecting means while the instantaneous value of said sawtooth voltage is between a lower level and an upper level set respectively in said lower and upper limit setting means, and a function generator being arranged to operate in synchronization with the above-mentioned object scanning beam and to vary said lower and upper levels to be set in said limit setting means according to a predetermined function which defines the desired shape of said local area of the image.

UNITED STATES PATENT OFFICE
CERTIFICATE OF CORRECTION

Patent No. 3,614,311      Dated October 19, 1971

Inventor(s) Tatsuo FUJIYASU et al

It is certified that error appears in the above-identified patent and that said Letters Patent are hereby corrected as shown below:

Page 1, column 1, line 10,

"1226/43" should read --12216/68--

Signed and sealed this 18th day of April 1972.

(SEAL)
Attest:

EDWARD M. FLETCHER, JR.          ROBERT GOTTSCHALK
Attesting Officer                  Commissioner of Patents